United States Patent
Kurian et al.

(10) Patent No.: US 11,095,456 B2
(45) Date of Patent: Aug. 17, 2021

(54) DISTRIBUTED TIERED DATA EXCHANGES WITHIN A BLOCKCHAIN NETWORK

(71) Applicant: BANK OF AMERICA CORPORATION, Charlotte, NC (US)

(72) Inventors: Manu Jacob Kurian, Dallas, TX (US); Gilbert Gatchalian, Union, NJ (US); Jayachandra Varma, Irving, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 315 days.

(21) Appl. No.: 16/421,725

(22) Filed: May 24, 2019

(65) Prior Publication Data
US 2020/0374128 A1 Nov. 26, 2020

(51) Int. Cl.
*H04L 29/06* (2006.01)
*H04L 9/32* (2006.01)
*H04L 12/24* (2006.01)

(52) U.S. Cl.
CPC .......... *H04L 9/3247* (2013.01); *H04L 9/3236* (2013.01); *H04L 41/5003* (2013.01); *H04L 2209/38* (2013.01)

(58) Field of Classification Search
CPC .............. H04L 9/3247; H04L 9/32336; H04L 41/50003; H04L 2209/38
See application file for complete search history.

(56) References Cited

U.S. PATENT DOCUMENTS

| | | | |
|---|---|---|---|
| 7,725,372 B2 | 5/2010 | Hahn-Carlson | |
| 7,895,122 B2 | 2/2011 | Flitcroft et al. | |
| 7,899,712 B2 | 3/2011 | May et al. | |
| 7,979,311 B2 | 7/2011 | Dawson et al. | |
| 8,001,025 B2 | 8/2011 | Vadhri | |
| 8,668,146 B1 | 3/2014 | McGhie et al. | |
| 9,824,408 B2 | 11/2017 | Isaacson et al. | |
| 9,922,381 B2 | 3/2018 | Isaacson et al. | |
| 10,693,658 B2* | 6/2020 | Jacobs | G06Q 20/3825 |
| 10,805,068 B1* | 10/2020 | Leise | G06Q 40/08 |

(Continued)

OTHER PUBLICATIONS

Nitesh Singh, Blockchain Based Data Sharing Framework, Dec. 2018, IRJET, vol. 05 Issue: pp. 1427-1429. (Year: 2018).*

*Primary Examiner* — Ghodrat Jamshidi
(74) *Attorney, Agent, or Firm* — Michael A. Springs; Moore & Van Allen PLLC; James C. Edwards

(57) ABSTRACT

Distributed tiered data exchanges within a distributed trust/blockchain network are provided for. A continual and ongoing data asset transfer being conducted via a distributed ledger of the distributed trust/blockchain network is leveraged for the purpose of establishing and conducting other continuous and ongoing data asset transfers using the same distributed ledger of the distributed trust/blockchain network. The tiered nature of the asset transfers/distributions means that one distributed ledger can be established and used to conduct multiple different continuous and ongoing data assets transfers between the initial data asset transfer entities and/or other entities. As such, through the use of one distributed ledger of a distributed trust/blockchain network, a single data asset request made by a first entity (i.e., data asset transferee) may be used to make multiple different data asset distributions/transfers to one or many different entities.

20 Claims, 7 Drawing Sheets

(56) References Cited

U.S. PATENT DOCUMENTS

| | | | |
|---|---|---|---|
| 2012/0023008 A1* | 1/2012 | Owen | G06Q 20/405 |
| | | | 705/39 |
| 2014/0279120 A1 | 9/2014 | Schulz | |
| 2015/0332256 A1* | 11/2015 | Minor | G06Q 20/381 |
| | | | 705/69 |
| 2016/0180327 A1* | 6/2016 | Stern | G06Q 20/401 |
| | | | 705/44 |
| 2017/0046792 A1* | 2/2017 | Haldenby | G06Q 20/405 |
| 2017/0345105 A1 | 11/2017 | Isaacson et al. | |
| 2017/0366516 A1* | 12/2017 | Pattanaik | H04L 63/0428 |
| 2018/0211313 A1* | 7/2018 | Narahari | G06Q 40/025 |
| 2018/0253722 A1 | 9/2018 | Gupta | |
| 2018/0376378 A1 | 12/2018 | Greene et al. | |
| 2019/0205870 A1* | 7/2019 | Kamalsky | G06Q 40/08 |
| 2019/0289019 A1* | 9/2019 | Thekadath | H04L 9/3239 |
| 2020/0202668 A1* | 6/2020 | Cotta | A63F 13/792 |

\* cited by examiner

DISTRIBUTED TIERED DATA EXCHANGES WITHIN A BLOCKCHAIN NETWORK

FIELD OF THE INVENTION

The present invention is generally directed to data exchanges within a distributed trust computing network and, more specifically, providing tiered data exchanges within a distributed trust computing network, such that multiple entities may be provided access to data assets stored within blocks of a distributed ledger and/or one or more entities may be provided time-dependent access to data assets stored with blocks of the distributed ledger.

BACKGROUND

The use of distributed trust/blockchain computing networks is becoming more prevalent to transfer assets amongst entities in a highly trusted network environment. Typically, in a blockchain a distributed ledger includes a plurality of blocks, each block associated with data asset that is being transferred from one entity to another entity.

However, a need exits to leverage the trusted nature of the distributed trust/blockchain computing network as a means for establishing and conducting further data asset transfers between the entities or other entities. In this regard, a need exists to leverage the trusted nature of a continuous and currently ongoing data asset transfer being conducted via a distributed ledger of a distributed trust/blockchain computing network to pivot to one or more other data asset transfers conducted between the same entities or one or more other entities.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, computer program product and/or the like for distributed tiered data exchanges within a distributed trust/blockchain computing network The present invention provides for a continual and ongoing data asset transfer being conducted via a distributed ledger of the distributed trust/blockchain computing network to be leveraged for the purpose of establishing and conducting other continuous and ongoing data asset transfers using the same distributed ledger of the distributed trust/blockchain computing network. In specific embodiments, the tiered nature of the asset transfers/distributions means that one distributed ledger, i.e., blockchain thread, can be used to conduct multiple different continuous and ongoing data assets transfers between the initial data asset transfer entities and/or other entities. As such, through the use of one distributed ledger of a distributed trust/blockchain computing network, a single data asset request made by a first entity (i.e., data asset transferee) may be used to make multiple different data asset distributions/transfers to one or many different entities.

Moreover, in specific embodiments of the invention, determinations are made as to the percentages or volumes of data assets to be distributed/transferred for each of the data asset distributions/transfers. The determination may be made in real-time and/or on a distribution/transfer basis or the determination be part of a schedule for data asset distributions/transfers that determines percentages or volume of data assets to be distributed/transferred over the course of a predetermined period for satisfying obligations associated with each of the data assets distributions/transfers.

In other specific embodiments of the invention, the data asset distribution/transfer may be timed or otherwise configured to occur as a series of data asset distributions/transfers between entities, in which the series of asset distribution occur on a regular interval or in some, embodiments provide for, at the bequest of the transferee entity and/or by agreement between the entities, one or more interrupted data asset distributions/transfers from the series of data asset distribution transfers.

A system for distributed tiered data exchanges in a distributed trust/blockchain computing network defines first embodiments of the invention. The system includes a distributed trust computing network including a plurality of decentralized nodes, each decentralized node having a first memory and at least one first processor in communication with the memory. The first memory of the decentralized nodes is configured to store at least one distributed ledger.

The system further includes a computing platform disposed in a distributed computing network and including a second memory and at least one second processor in communication with the second memory. The second memory stores instructions that are executable by the second processor and configured to receive a plurality of first data asset transfer requests, each first data asset transfer request configured to transfer a data asset from a first entity to a second entity. Each transfer of the data asset is a portion of a first obligation allocated by the first entity to the second entity. The instructions are further configured to generate, and store within a distributed ledger of the distributed trust computing network, a plurality of first data blocks, each first data block (i) storing the data asset from one of the plurality of first data asset transfer requests, and (ii) configured to provide the second entity access to at least a portion of the data asset. The instructions are further configured to, in response to (1) the first entity establishing a second obligation allocated by the first entity to either the second entity or a third entity, and (2) receiving a plurality of second data asset transfer requests, generate, and store within the distributed ledger, second data blocks, each second data block (i) storing the data asset from one of the plurality of second data asset transfer requests, and (ii) configured to provide (a) the second entity access to a first segment of the data asset for satisfying at least a portion of the first obligation, and (b) the second entity or third entity access to a second segment of the data asset for satisfying at least a portion of the second obligation.

In specific embodiments of the system, the first entity establishes the second obligation based on one selected from the group consisting of (i) at least in part on the plurality of first data blocks stored within the distributed ledger, and (ii) solely on the plurality of first data blocks stored within the distributed ledger. In this regard, the first data blocks and the conveyance of the data assets therein to the second entity provide serve as the leverage necessary for the first entity to establish the second obligation.

In other specific embodiments of the system, the instructions are further configured to in response to (1) the first entity establishing a further obligation allocated by the first entity to either the second entity, the third entity or another entity, and (2) receiving a plurality of further data asset transfer requests, generate, and store within the distributed ledger, further data blocks, each further data block (i) storing the data asset from one of the plurality of further data asset transfer requests, and (ii) configured to provide (a) the second entity access to a first segment of the data asset for satisfying the first obligation, (b) the second entity or third entity access to the second segment of the data asset for satisfying the second obligation, and (c) the second entity, third entity or the further entity access a third segment of the data asset for satisfying the further obligation. In this regard, the data blocks are configured to provide tiered access to multiple entities (e.g., first tier (a), second tier (b), third tier (c) and so on) for accessing the data asset.

In still further embodiments of the system, the instructions are further configured to generate, and store within the distributed ledger, the second data blocks by generating, and storing within the distributed ledger, first-sub data blocks and second-sub data blocks. Each first-sub data block (i) storing a first segment of the data asset from one of the plurality of second data asset transfer requests, and (ii) configured to provide the second entity access to the first segment of the data asset for satisfying the first obligation, and each second-sub data block (iii) storing a second segment of the data asset from one of the plurality of second data asset transfer requests, and (iv) configured to provide the second entity or the third entity access to the second segment of the data asset for satisfying the second obligation.

In further specific embodiments of the system, the instructions are further configured to, in response to the first entity establishing the second obligation allocated by the first entity to either the second entity or a third entity, determine, for each second data block, a first percentage of the data asset as the first segment of the data asset for satisfying the first obligation and a second percentage of the data asset as the second segment of the data asset for satisfying the second obligation. In other related embodiments of the system, the instructions are further configured to, in response to the first entity establishing a second obligation allocated by the first entity to either the second entity or a third entity, determine a data asset allocation schedule configured to establish, for each subsequent second data asset transfer request, a first percentage of the data asset as the first segment of the data asset for satisfying the first obligation and a second percentage or volume of the data asset as the second segment of the data asset for satisfying the second obligation.

In still further embodiments of the system, the instructions are further configured to, in response to the first entity establishing a second obligation allocated by the first entity to either the second entity or a third entity, determine an additional period of time for satisfying the first obligation allocated by the first entity to the second entity.

In yet other specific embodiments of the system, the instructions are further configured to provide (a) the second entity access, for a first predetermined period of time, to the first segment of the data asset for satisfying at least a portion of the first obligation, and (b) the second entity or third entity access, for the first predetermined period of time, to the second segment of the data asset for satisfying at least a portion of the second obligation. In such embodiments of the system, the first predetermined period of time is selected from a group consisting of (i) a current period of time, and (ii) a future period of time.

Moreover, in further specific embodiments of the system, the instructions are further to, in response to at least one selected from the group consisting of (i) the second entity not accessing an entirety of the first segment during the first predetermined period of time, and (ii) the second or third entity not accessing an entirety of the second segment during the first predetermined period of time, generate, and store within the distributed ledger, one or more third data blocks, each third data block storing at least a portion of the first segment or second segment of the data asset not accessed during the first predetermined time period. The second entity or the third entity is provided access a third data block for a second predetermined period of time. In such embodiments of the system, the second predetermined period of time is selected from the group consisting of (i) a period of time commencing at an expiration of the first predetermined period of time, and (ii) a period of time commencing after a time delay from the expiration of the first predetermined period of time.

In yet further specific embodiments of the system, the instructions are further configured to receive the first data asset transfer requests and the second data asset transfer requests. At least one of the first data asset transfer requests or the second data asset transfer requests is configured to cause the instructions to generate, and store in the first memory of the distributed ledger, a series of the first data blocks or a series of the second data blocks. Each data block in the series of first data blocks provides the second entity with access to the data asset for a predetermined period of time and each data block in the series of second data blocks provides (i) the second entity access to the first segment of the data asset for a predetermined period of time, and (ii) the second entity or the third entity access to the second segment of the data asset for a predetermined period of time.

A computer-implemented method for distributed tiered data exchanges in a distributed trust/blockchain computing network defines second embodiments of the invention. The method is executed by one or more computing device processors. The method includes receiving a plurality of first data asset transfer requests. Each first data asset transfer request configured to transfer a data asset from a first entity to a second entity. Each transfer of the data asset is a portion of a first obligation allocated by the first entity to the second entity. The method further includes generating, and storing within a distributed ledger of the distributed trust computing network, a plurality of first data blocks. Each first data block (i) storing the data asset from one of the plurality of first data asset transfer requests, and (ii) configured to provide the second entity access to at least a portion of the data asset. The method further includes, in response to (1) the first entity establishing a second obligation allocated by the first entity to either the second entity or a third entity, and (2) receiving a plurality of second data asset transfer requests, generating, and storing within the distributed ledger, second data blocks, each second data block (i) storing the data asset from one of the plurality of second data asset transfer requests, and (ii) configured to provide (a) the second entity access to a first segment of the data asset for satisfying at least a portion of the first obligation, and (b) the second entity or third entity access to a second segment of the data asset for satisfying at least a portion of the second obligation.

In specific embodiments of the computer-implemented method, the first entity establishes the second obligation based on one selected from the group consisting of (i) at least in part on the plurality of first data blocks stored within the distributed ledger, and (ii) solely on the plurality of first data blocks stored within the distributed ledger.

In other specific embodiments the computer-implemented method includes in response to (1) the first entity establishing a further obligation allocated by the first entity to either the second entity, the third entity or another entity, and (2) receiving a plurality of further data asset transfer requests, generating, and storing within the distributed ledger, further data blocks, each further data block (i) storing the data asset from one of the plurality of further data asset transfer requests, and (ii) configured to provide (a) the second entity access to a first segment of the data asset for satisfying the first obligation, (b) the second entity or third entity access to the second segment of the data asset for satisfying the second obligation, and (c) the second entity, third entity or the further entity access a third segment of the data asset for satisfying the further obligation.

In additional specific embodiments the computer-implemented method includes, in response to the first entity establishing a second obligation allocated by the first entity to either the second entity or a third entity, determining, for each second data block, a first percentage of the data asset as the first segment of the data asset for satisfying the first obligation and a second percentage of the data asset as the second segment of the data asset for satisfying the second obligation.

A computer program product including a non-transitory computer-readable medium defines third embodiments of the invention. The computer readable medium stores a first set of codes for causing a computer to receive a plurality of first data asset transfer requests, each first data asset transfer request configured to transfer a data asset from a first entity to a second entity. Each transfer of the data asset is a portion of a first obligation allocated by the first entity to the second entity. The computer-readable medium additionally stores a second set of codes for causing a computer to generate, and store within a distributed ledger of the distributed trust computing network, a plurality of first data blocks. Each first data block (i) storing the data asset from one of the plurality of first data asset transfer requests, and (ii) configured to provide the second entity access to at least a portion of the data asset. The computer-readable medium additionally stores a third set of codes for causing a computer to, in response to (1) the first entity establishing a second obligation allocated by the first entity to either the second entity or a third entity, and (2) receiving a plurality of second data asset transfer requests, generate, and store within the distributed ledger, second data blocks, each second data block (i) storing the data asset from one of the plurality of second data asset transfer requests, and (ii) configured to provide (a) the second entity access to a first segment of the data asset for satisfying at least a portion of the first obligation, and (b) the second entity or third entity access to a second segment of the data asset for satisfying at least a portion of the second obligation.

In specific embodiments of the computer program product, the computer-readable medium additionally stores a fourth set of codes for causing a computer to, in response to (1) the first entity establishing a further obligation allocated by the first entity to either the second entity, the third entity or another entity, and (2) receiving a plurality of further data asset transfer requests, generating, and storing within the distributed ledger, further data blocks, each further data block (i) storing the data asset from one of the plurality of further data asset transfer requests, and (ii) configured to provide (a) the second entity access to a first segment of the data asset for satisfying the first obligation, (b) the second entity or third entity access to the second segment of the data asset for satisfying the second obligation, and (c) the second entity, third entity or the further entity access a third segment of the data asset for satisfying the further obligation.

In other specific embodiments of the computer program product the computer-readable medium stores a fourth set of codes for causing a computer to, in response to the first entity establishing a second obligation allocated by the first entity to either the second entity or a third entity, determining, for each second data block, a first percentage of the data asset as the first segment of the data asset for satisfying the first obligation and a second percentage of the data asset as the second segment of the data asset for satisfying the second obligation.

Thus, according to embodiments of the invention, which will be discussed in greater detail below, the present invention provides for distributed tiered data exchanges within a distributed trust/blockchain computing network. A continual and ongoing data asset transfer being conducted via a distributed ledger of the distributed trust/blockchain computing network is leveraged for the purpose of establishing and conducting other continuous and ongoing data asset transfers using the same distributed ledger of the distributed trust/blockchain computing network. The tiered nature of the asset transfers/distributions means that one distributed ledger, i.e., blockchain thread, can be used to conduct multiple different continuous and ongoing data assets transfers between the initial data asset transfer entities and/or other entities. As such, through the use of one distributed ledger of a distributed trust/blockchain computing network, a single data asset request made by a first entity (i.e., data asset transferee) may be used to make multiple different data asset distributions/transfers to one or many different entities.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
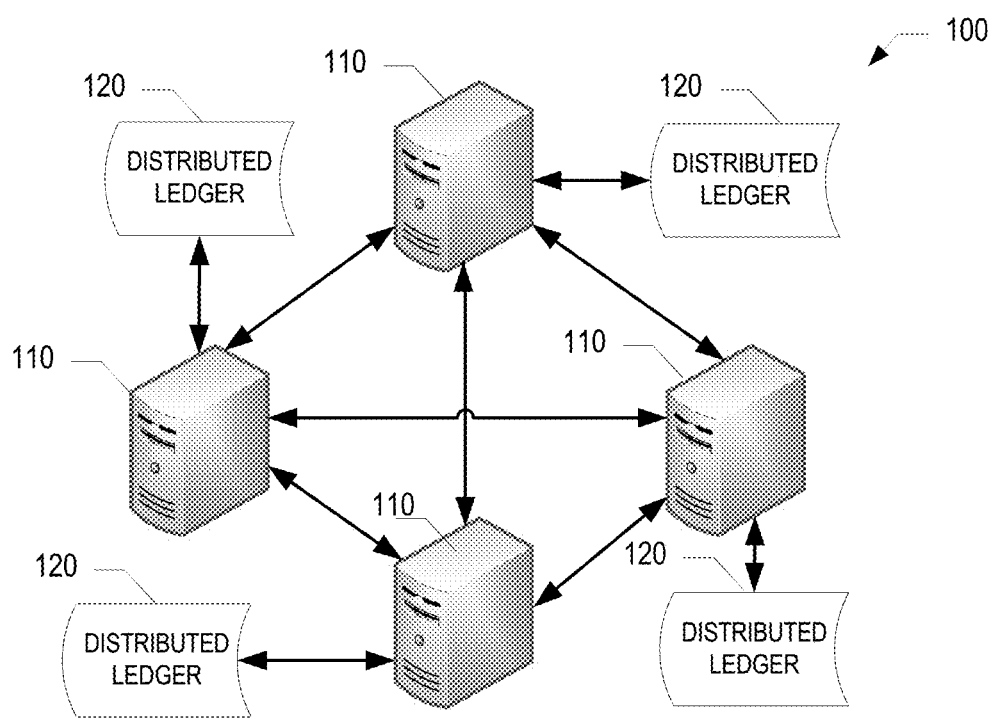
Figure 2:
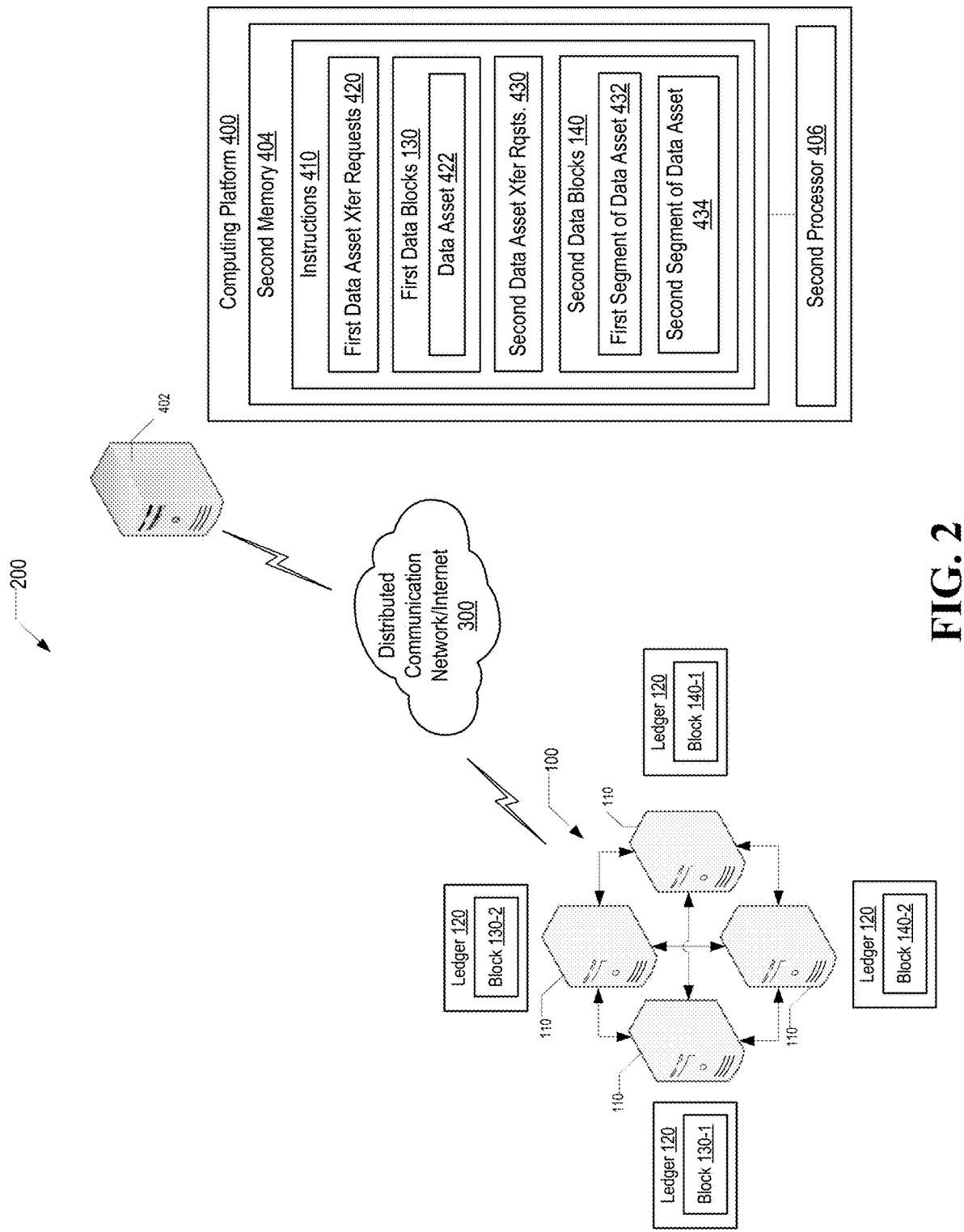
Figure 3:
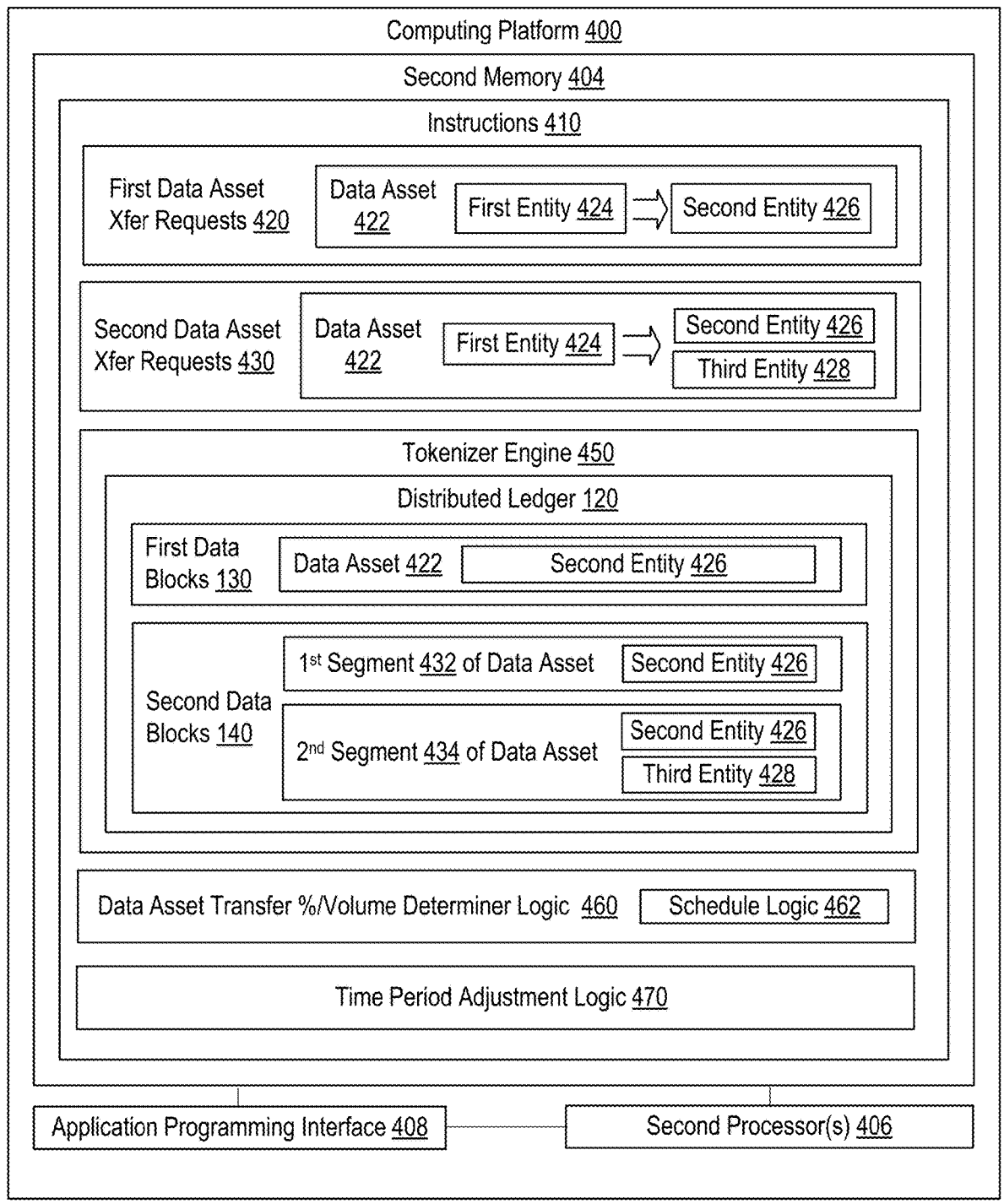
Figure 4:
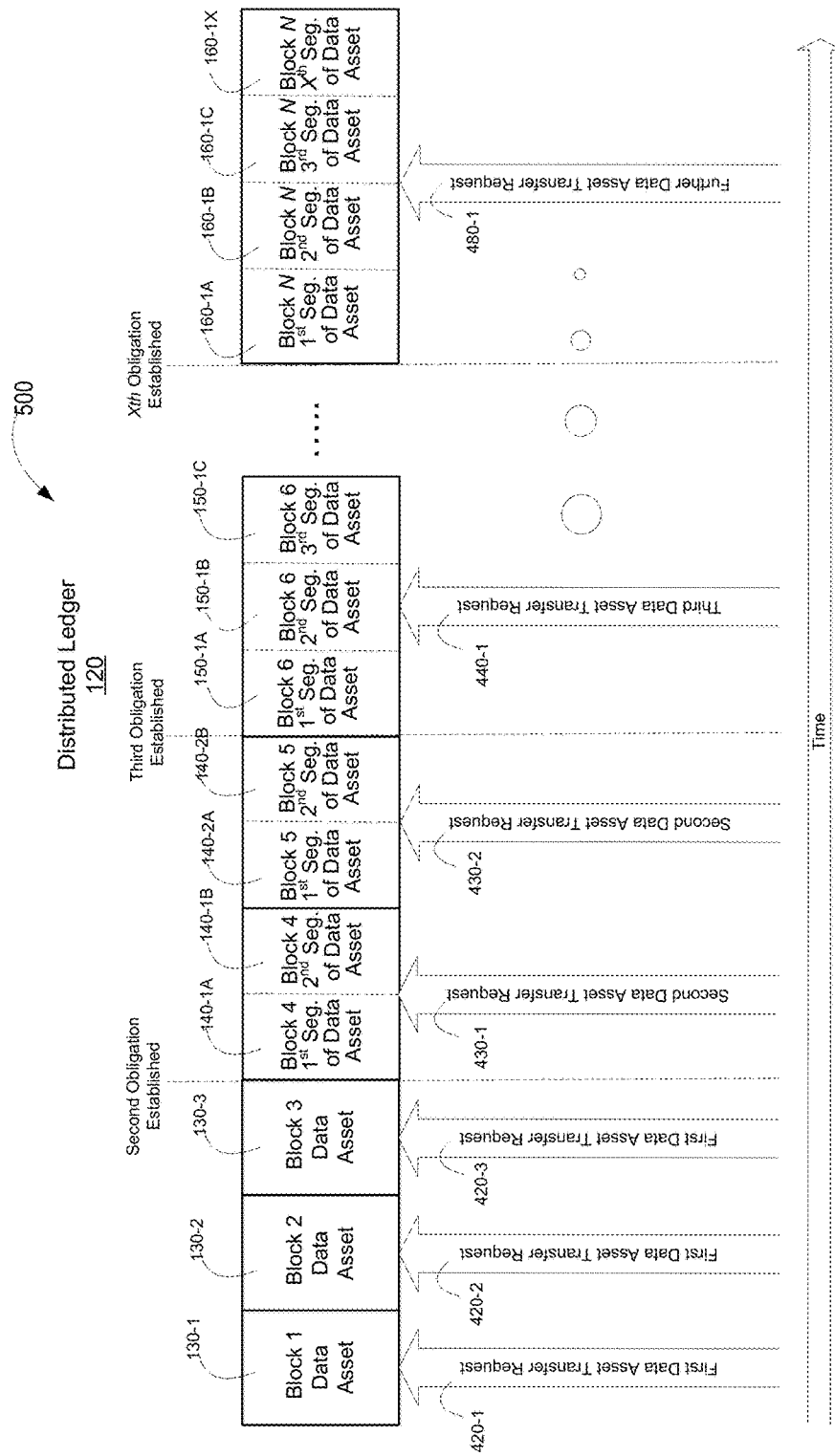
Figure 5:
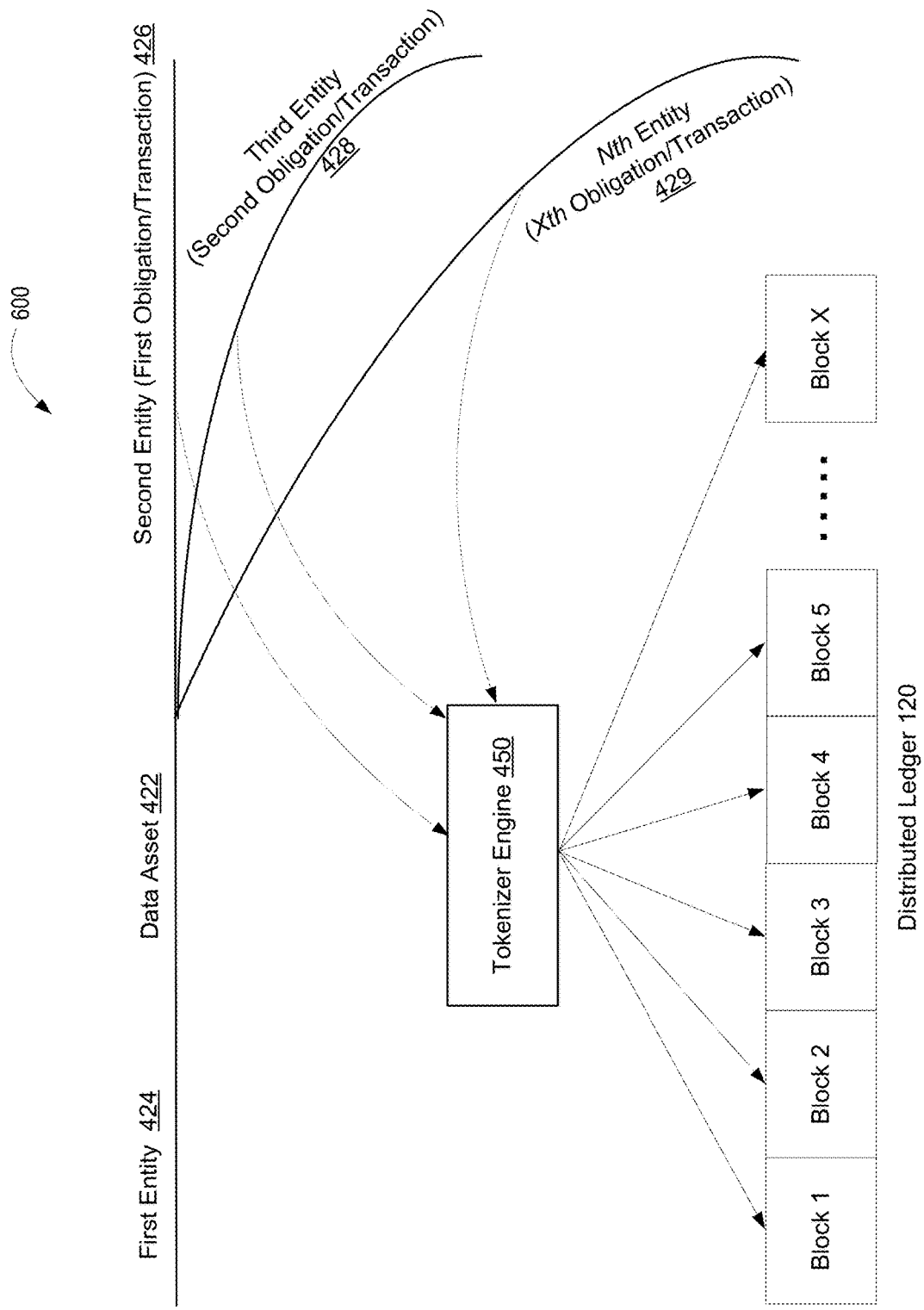
Figure 6:
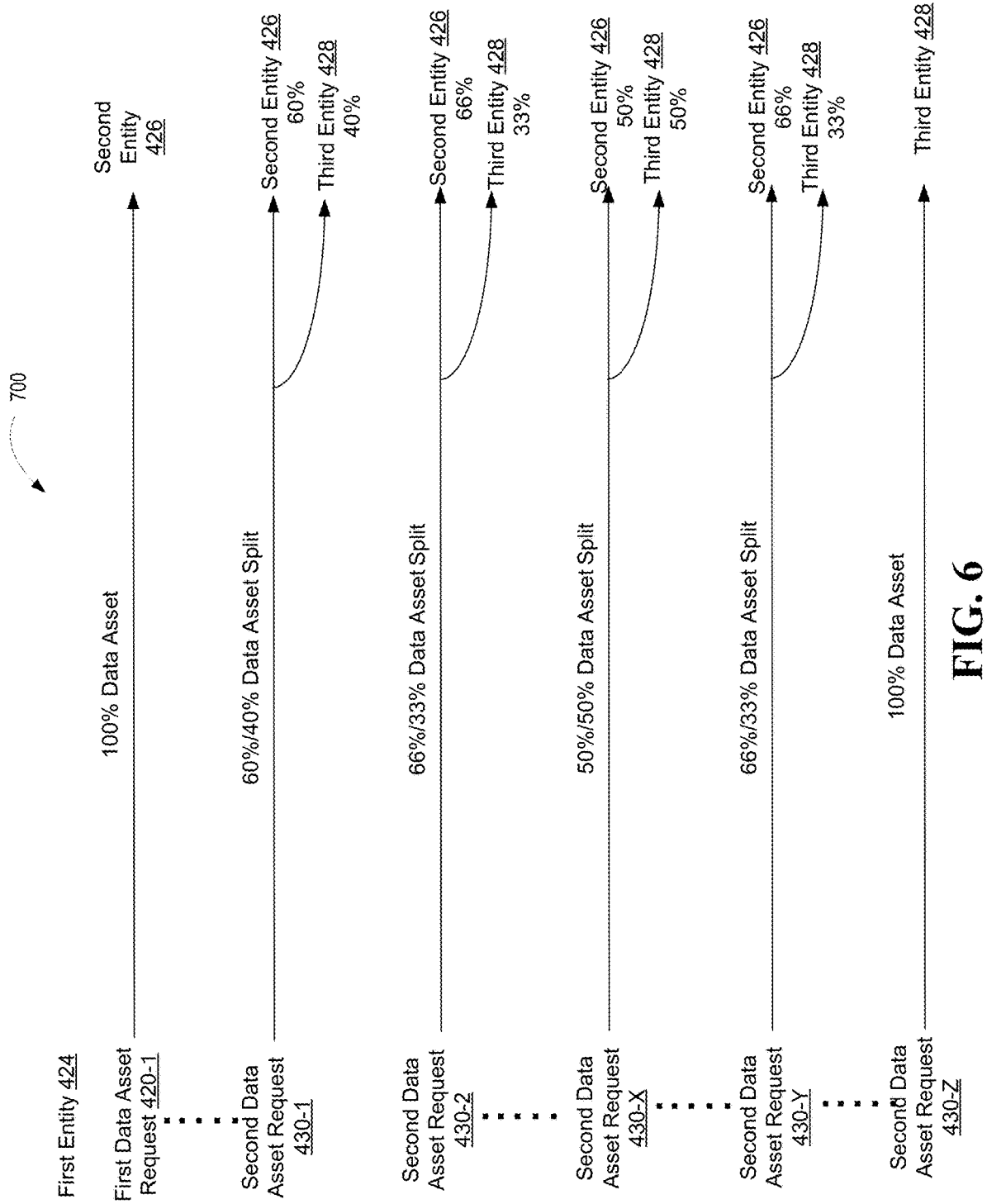
Figure 7:
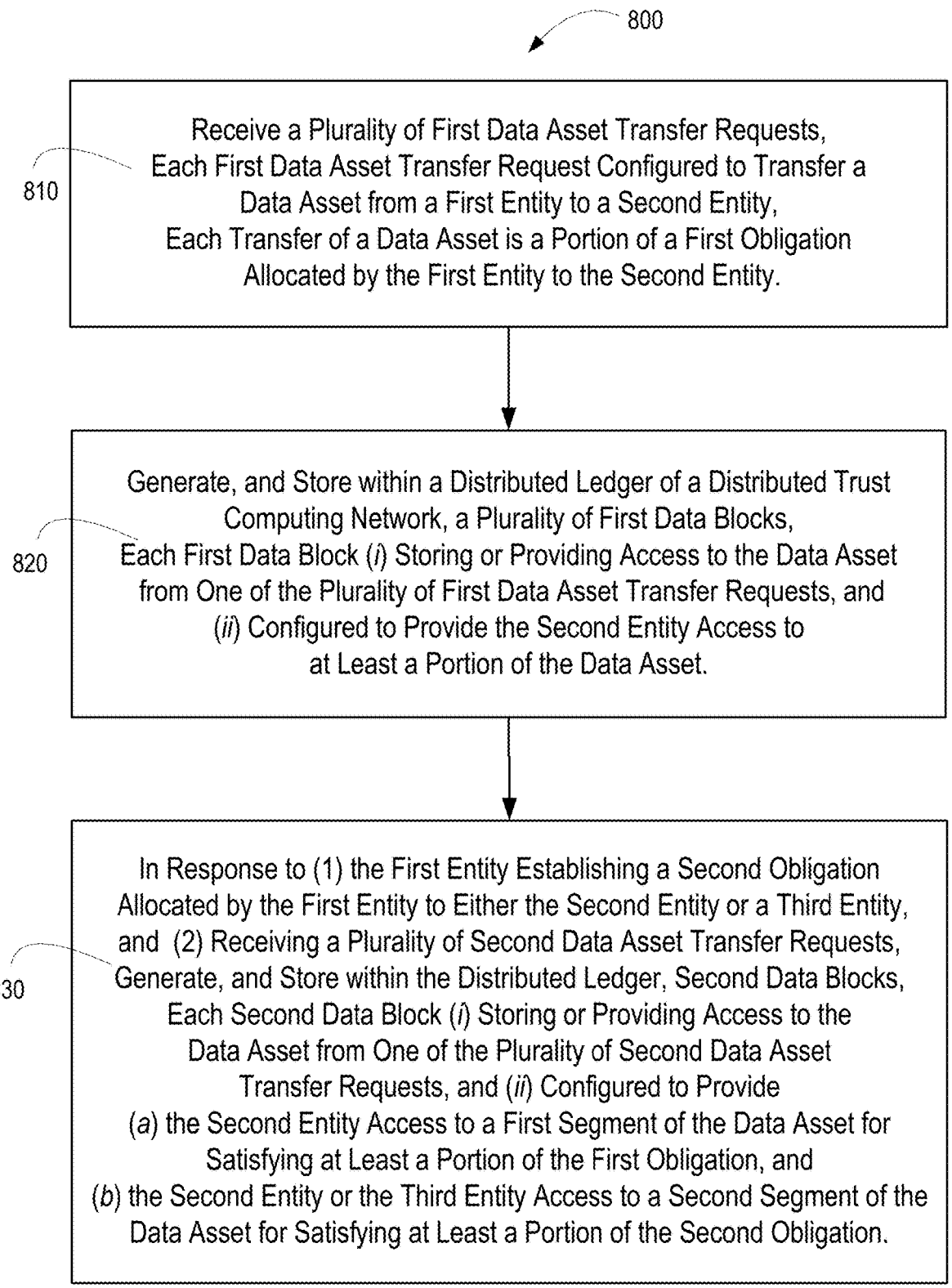

Having thus described embodiments of the disclosure in general terms, reference will now be made to the accompanying drawings, wherein:

FIG. 1 is a schematic diagram of a distributed trust computing network, such as a distributed trust/blockchain computing network, in accordance with some embodiments of the present disclosure;

FIG. 2 is a schematic diagram of a system for distributed tiered data exchanges within a distributed trust/blockchain computing network, in accordance with some embodiments of the present disclosure;

FIG. 3 is a block diagram of an a computing platform configured for distributed tiered data exchanges within a distributed trust/blockchain computing network, in accordance with some embodiments of the present disclosure;

FIG. 4 is a schematic diagram showing data asset transfer requests over time and the associated data blocks within a distributed ledger of a distributed trust computing network, in accordance with embodiments of the present invention;

FIG. 5 is a schematic diagram illustrating the concept of multiple obligations between the first entity and other entities and the segmenting of a data asset within a single distributed ledger/thread of a distributed trust/blockchain computing network, in accordance with embodiments of the present invention;

FIG. 6 is a schematic diagram illustrating the concept of segmenting a data asset within a data block of a distributed ledger according to different transfer/distribution percentages, in accordance with embodiments of the present invention; and FIG. 7 is flow diagram of a method for distributed tiered data exchanges within a distributed trust/blockchain computing network, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed for distributed tiered data exchanges within a distributed trust/blockchain computing network The present invention provides for a continual and ongoing data asset transfer being conducted via a distributed ledger of the distributed trust/blockchain computing network to be leveraged for the purpose of establishing and conducting other continuous and ongoing data asset transfers using the same distributed ledger of the distributed trust/blockchain computing network. In specific embodiments, the tiered nature of the asset transfers/distributions means that one distributed ledger, i.e., blockchain thread, can be used to conduct multiple different continuous and ongoing data assets transfers between the initial data asset transfer entities and/or other entities. As such, through the use of one distributed ledger of a distributed trust/blockchain computing network, a single data asset request made by a first entity (i.e., data asset transferee) may be used to make multiple different data asset distributions/transfers to one or many different entities.

Moreover, in specific embodiments of the invention, determinations are made as to the percentages or volumes of data assets to be distributed/transferred for each of the data asset distributions/transfers. The determination may be made in real-time and/or on a distribution/transfer basis or the determination be part of a schedule for data asset distributions/transfers that determines percentages or volume of data assets to be distributed/transferred over the course of a predetermined period for satisfying obligations associated with each of the data assets distributions/transfers.

In other specific embodiments of the invention, the data asset distribution/transfer may be timed or otherwise configured to occur as a series of data asset distributions/transfers between entities, in which the series of asset distribution occur on a regular interval or in some, embodiments provide for, at the bequest of the transferee entity and/or by agreement between the entities, one or more interrupted data asset distributions/transfers from the series of data asset distribution transfers.

Turning now to the figures, FIG. 1 a schematic diagram is provided of an exemplary distributed trust computing network 100 otherwise referred to herein as a blockchain network or "block chain", in accordance with embodiments of the present invention. The distributed trust computing network 100 is a distributed database that maintains, e.g., a list of data records, or the like. The security of the data maintained within the trust network is enhanced by the distributed nature of the network/block chain. The distributed trust computing network 100 typically includes several nodes 110, which may be one or more systems, machines, computers, databases, data stores or the like operably connected with one another. In some instances, each of the nodes 110 or multiple nodes 110 are maintained by different entities. A distributed trust computing network 100 typically works without a central repository or single administrator. One well-known application of a distributed trust computing network/block chain is the public ledger of transactions for cryptocurrencies such as used in bitcoin. The data records recorded in the distributed trust computing network/block chain are enforced cryptographically and stored on the nodes 100 of the block chain.

A distributed trust computing network 100 provides numerous advantages over traditional storage networks/databases. A large number of nodes 110 of a trust network may reach a consensus regarding the validity of resources maintained with a block of the blockchain. Additionally, when multiple versions of a record exist on the ledger 120, multiple nodes 110 can converge on the most up-to-date version of the record, such that the most-up-to-date version of the record is the only one of the versions that is validated. For example, any node 110 within the distributed trust computing network 100 that stores a record can determine within a level of certainty whether the record can be authenticated/authorized to take place and become final by confirming that no conflicting records are confirmed by the distributed trust computing network/block chain elsewhere.

The blockchain chain typically has two primary types of records. The first type is the record type, which consists of the actual data stored in a block 130 within a distributed ledger 120. The second type is the block type, which are records that confirm when and in what sequence certain events became recorded as part of the blockchain. Records and the events associated therewith are created by participants using the blockchain in its normal course of business, for example, when record is received, a block(s) 130 is created by users known as "miners" who use specialized software/equipment to create blocks 130. Holders (also, referred to as users) of a block 130 of the blockchain agree to store a record within the distributed trust computing network 100 and the related records are passed around to various nodes 110 of the distributed trust computing network 100. A "valid" record or related event is one that can be validated based on a set of rules that are defined by the particular system implementing the distributed trust computing network/block chain.

A distributed trust computing network/block chain 100 is typically decentralized—meaning that a distributed ledger 120 (i.e., a decentralized ledger) is maintained on multiple nodes 110 of the trust network/block chain 100. One node 110 in the distributed trust computing network 100/block chain may have a complete or partial copy of the entire ledger 120 or set of records and/or blocks 130 on the distributed trust computing network 100/block chain. Events are initiated at a node 110 of a distributed trust computing network 100/block chain and communicated to the various nodes 110 of the distributed trust computing network 100/blockchain. Any of the nodes 110 can validate a record or an associated event, add the record or the details of the storage event to its copy of the distributed ledger 120, and/or broadcast the record or details of the storage event, its associated validation (in the form of a block 130) and/or other data to other nodes 110. The distributed trust computing network 100 shown in FIG. 1 is configured to perform one or more of the steps or functions performed by the system shown in FIG. 2, the computing platform shown in FIG. 3 and the methods described by FIG. 7.

Referring to FIG. 2, a block diagram is presented of a system 200 for distributed tiered data exchanges within a distributed trust/blockchain computing network, in accordance with embodiments of the present invention. The system 200 includes a distributed trust computing network 100 as described in relation to FIG. 1. The distributed trust computing network 100 includes a plurality of decentralized nodes 110. Each decentralized node 110 having a first memory (not shown in FIG. 2) and at least one first processor (not shown in FIG. 2) in communication with the first memory. The first memory of the decentralized nodes 110 is configured to store a distributed ledger 120 that includes a plurality of data blocks 130-1, 130-2, 140-1, 140-2. The processors of distributed trust computing network 100 are configured to certify/validate that the data blocks 130-1, 130-2, 140-1, 140-4 are authentic and unaltered.

The system additionally includes a computing platform 400 disposed within a distributed communication network 300, such as the Internet and/or intranets. The computing platform 400 may comprise one or more computing devices, for example server(s) 402 or the like. In specific embodiments of the system, the computing platform 400 is under the control of a trusted entity, such as a financial institution or the like. The computing platform 400 includes a second memory 404 and at least one second processor 406 in communication with the second memory 404.

The second memory stored instructions 410 that are executable by second processor 406. The instructions 410 are configured to receive first data asset transfer requests 420. Each of the of the first data asset transfer requests 420 are configured to transfer a data asset 422 from a first entity to a second entity. Further, each transfer of the data asset 422 is a portion of a first obligation allocated by the first entity to the second entity.

For example, in specific embodiments of the invention, each first data asset transfer request 420 is a payment request for conducting a data asset 422 transfer (e.g., payment) between the first entity (e.g., a buyer) and a second entity (e.g., seller). The data asset transfer (e.g., payment) is a portion of a first obligation (e.g., vehicle loan or the like) owed by the first entity (e.g., buyer) to the second entity (e.g., seller/loan holder or the like). Those of ordinary skill in the art will appreciate that a payment/financial funds is but one example of a data asset 422 and that other transferable data assets 422 are also contemplated and within the scope of the inventive concepts herein disclosed.

In response to receiving the first data asset transfer requests 420, the instructions 410 are configured to generate, and store within first memory of the decentralized nodes 110, a distributed ledger 120 comprising a plurality of first data blocks 130. Each first data block 130 (i) stores or provides access to the data asset 422 from one of the plurality of first data asset transfer requests 420, and (ii) is configured to provide the second entity access to at least a portion of the data asset 422. In the example provided above, the first data block 130 serves as the transaction record for the data asset 422 transfer (e.g., payment) and provides the second entity (e.g., seller/loan holder or the like) access to the data asset (e.g., financial funds).

In response to (i) the first entity establishing a second obligation allocated by the first entity to either the second entity or a third entity, and (ii) receiving a plurality of second data asset transfer requests 430, second data blocks 140 are generated and stored within the distributed ledger 120. Each second data block 140 (i) stores or provides access to the data asset from one of the plurality of second data asset transfer requests 430, and (ii) configured to provide (a) the second entity access to a first segment 432 of the data asset for satisfying at least a portion of the first obligation, and (b) the second entity or third entity access to a second segment 434 of the data asset for satisfying at least a portion of the second obligation. In this regard, the second data blocks 140 are partitioned or otherwise segmented so that the second entity can access/obtain a first portion of the data assets to satisfy a portion of the first obligation and second entity or third entity (i.e., the entity to whom the first entity owes the second obligation) can access/obtain a second portion of the data assets to satisfy a portion of the second obligation.

In specific embodiments of the invention, the establishment of the second obligation (e.g., second vehicle loan or the like) is based at least in part and, in some embodiments, solely on the first data blocks 130 of the distributed ledger 120. The first data blocks 130 providing a verified truth that the first entity has performed, on schedule, in making the required data asset transfers and has acquired at least an equity interest in the subject matter (e.g., first vehicle) of the first data asset transfers. In this regard, in specific embodiments of the invention, the first entity is able to establish the second obligation without having to provide an upfront data asset transfer (e.g., no down payment), since equity interest in the subject matter of the first data asset transfers may serve as collateral for establishing the second obligation.

In addition, in those embodiments in which the second obligation is established between the first entity and a third entity, the second and third entity have an indirect relationship, such as both entities are associated with the trusted entity managing the distributed tiered asset distribution process, e.g., a financial institution or the like.

Moreover, as will be discussed infra., further obligations between the first entities and another entity (i.e., the second entity, the third entity or a further entity) may result in further segmenting of data blocks added to the distributed ledger, such that a single data asset payment request results in multiple different data asset transfers to one or more entities.

Referring to FIG. 3 a block diagram is depicted of the computing platform 400 configured for distributed tiered data exchanges within a distributed trust/blockchain computing network, in accordance with embodiments of the present invention. Computing platform 400, which comprise one or more computing devices (e.g., personal computers, servers or the like), is configured to execute instructions 410, such as algorithms, modules, routines, applications and the like. Computing platform 400 includes second memory 404, which may comprise volatile and non-volatile memory, such as read-only and/or random-access memory (RAM and ROM), EPROM, EEPROM, flash cards, or any memory common to computing platforms). Moreover, second memory 404 may comprise cloud storage, such as provided by a cloud storage service and/or a cloud connection service.

Further, computing platform 400 also includes at least one second processor 406, which may be an application-specific integrated circuit ("ASIC"), or other chipset, logic circuit, or other data processing device. Second processor 406 may execute one or more application programming interface (APIs) 408 that interfaces with any resident programs, such as instructions 410 or the like, stored in the second memory 404 of the computing platform 400 and any external programs. Second processor 406 may include various processing subsystems (not shown in FIG. 3) embodied in hardware, firmware, software, and combinations thereof, that enable the functionality of computing platform 400 and the operability of the computing platform 400 on the distributed computing network 300 (shown in FIG. 2). For example, processing subsystems allow for initiating and maintaining communications and exchanging data with other networked devices. For the disclosed aspects, processing subsystems of second processor 406 may include any subsystem used in conjunction with instructions 410 and related tools, routines, sub-routines, algorithms, sub-algorithms, sub-modules thereof.

Computing platform 400 may additionally include a communications module (not shown in FIG. 3) embodied in hardware, firmware, software, and combinations thereof, that enables electronic communications between the computing platform 400 and other network devices, such as those shown in FIG. 2. Thus, communication module may include the requisite hardware, firmware, software and/or combinations thereof for establishing and maintaining a network communication connection with one or more distributed trust.

Second memory 404 of computing platform 400 stores instructions 410 configured provide tiered distribution of data assets through blocks of a single distributed ledger stored in a distributed trust/blockchain computing network, in accordance with embodiments of the present invention. In specific embodiments of the invention the instructions 410 may be implemented by a trusted entity, such as a financial institution or the like.

The instructions 410 are configured to receive first data asset transfer requests 420. Each of the of the first data asset transfer requests 420 are configured to transfer a data asset 422 from a first entity 424 to a second entity 426. Further, each transfer of the data asset 422 is a portion of a first obligation allocated by the first entity to the second entity. As previously discussed in specific embodiments of the invention, the first data asset transfer requests 420 are payment requests made by a buyer (i.e., first entity) for conducting a payment (i.e., data asset transfer) between the buyer/loaner and a seller/loanee (i.e., second entity). In such embodiments of the invention, the first obligation is a loan or other payment vehicle requiring a series of payments for a specified amount (i.e., loan payment amount) over a predetermined period of time (i.e., loan cycle or the like). In such embodiments of the invention, the first data asset transfer requests 420 may be individual electronic checks or the like provided by the first entity/buyer in accordance with the data asset transfer schedule (e.g., loan payment schedule) or a single electronic check set-up for recurring data asset transfer to occur in accordance with the data asset transfer schedule (e.g., monthly data asset transfers as required by loan payment schedule).

In response to receiving a first data asset transfer request 420, the tokenizer engine 450 reads the string of data from the electronic request, generates a first data block 130 and stores the first data block 130 in the distributed ledger 120 of the distributed trust/blockchain computing network. The first data block 130 stores and/or otherwise provides access to the data asset 422 associated with the first data asset transfer request 420. Once stored within the distributed ledger 120, the first data block 130 is configured to provide the second entity 426 access to at least a portion of the data asset 422. In specific embodiments of the invention. In which the first data asset transfer request 420 is a monthly payment, the first data block 130 may be configured to provide the second entity 426 to access to the entirety of the data asset 422. In other embodiments of the invention, in which the data asset transfer request is for multiple monthly payments or the like, the first data block 130 may be configured to the second entity 426 to access to portions of the data asset 422 or a predetermined schedule (e.g., a first portion during a first month, a second portion during a second month and the like).

In response to (i) the first entity 424 establishing a second obligation allocated by the first entity 424 to either the second entity 426 or a third entity 428, and (ii) receiving one of plurality of second data asset transfer requests 430, the tokenizer engine 450 reads the string data from the electronic request, generates a second data block 140 and stores the second data 130 within the same distributed ledger 120 of the distributed trust/blockchain computing network. The second data block 140 is configured to provide the second entity 426 access to a first segment 432 of the data asset 422 for satisfying a portion the first obligation and the second entity 426 or the third entity access 428 to a second segment 434 of the data asset 422 for satisfying a portion of the second obligation.

In specific embodiments of the invention, the second obligation may be associated with a second transaction/loan for a second vehicle or any other service or good being acquired with periodic payments over time. The second obligation may be established between the first entity (e.g., buyer) and the same entity as the first obligation (e.g., second entity) or a new entity (e.g., third entity). As previously discussed the second and third entity may have an indirect relationship, such as both entities are associated with the trusted entity managing the distributed tiered asset distribution process, e.g., a financial institution or the like.

In such embodiments of the invention, the second obligation may be established solely based on the first data blocks 130 of the distributed ledger 120. The first data blocks 130 providing a verified truth that the first entity has performed, on schedule, in making the required data asset transfers and has acquired at least an equity interest in the subject matter (e.g., first vehicle) of the first data asset transfers. In this regard, in specific embodiments of the invention, the first entity is able to establish the second obligation without having to provide an upfront data asset transfer (e.g., no down payment), since equity interest in the subject matter of the first obligation (i.e., the first data asset transfers) may serve as collateral for establishing the second obligation.

The second data blocks 140 may be configured with sub-blocks, such that a first sub-block stores and provides access to the first segment 432 of the data asset 422 and a second sub-block stores and provides access to the second segment 434 of the data asset 422. In other specific embodiments of the invention, each second block 140 stores and provides access to either the first segment 432 of the data asset 422 or the second segment 434 of the data asset 422.

The instructions 410 additionally include data asset transfer percentage/volume determiner logic 460 which is configured to determine the percentage or volume of the data asset 422 to allocate to the first segment 432 and second segment 434 for each of the second data blocks 140. The data asset transfer percentage/volume determiner logic 460 may determine the percentage or volume of data assets to allocate to the first segment 432 and second segment 434, dynamically, on a second data asset transfer request 430 basis. In this regard, as shown in discussed in relation to FIG. 6 infra., the percentages/volumes allocated to the first and second segments may change over time and be dependent on various factors, such as but not limited to factors related to market/economic stability, first entity data asset availability and the like. In addition the amount of the overall data asset associated with each of the second data asset transfer requests 430 may be the same amount as the data asset associated with the first data asset transfer requests 420 or the amount of the data assets may be different. In addition, the amount of the data assets associated with either the first or second data asset transfer requests may vary over time, such variance may be at the discretion of the first entity or may be determined by the data asset transfer percentage/volume determiner logic 460.

In other specific embodiments of the invention, the data asset transfer percentage/volume determiner logic 460 may include schedule logic 462 that is configured to determine at least one of per-second data asset request volume (e.g., the volume of funds for each payment request) and/or the percentage allocation for each first segment 432 and second segment 434 over the course of the first obligation period and/or the second obligation period. The schedule logic may determine a schedule at the onset of the second obligation and/or receipt of the first of the second data asset transfer requests 430 and/or the schedule may be dynamically updated/changed by the schedule logic 462 at any point in time during the period for satisfying the first obligation and/or the second obligation.

The instructions 410 may further include time period adjustment logic 470 this is configured to, in response to the first entity 424 establishing the second obligation with the second entity 426 or the third entity 428, adjust the time period for the first obligation. For example, the time period for the first obligation may be extended to compensate for the fact a portion of the data assets 422 associated with the second data asset transfer requests 430 are being segmented to satisfying portions of both the first obligation and the second obligation.

In specific embodiments of the invention, the data assets 422 stored in or accessible to the second/third entities 426, 428 are accessible for a predetermined period of time or on a predetermined date. The predetermined period of time or date may commence upon the storage and verification of the data block 420, 430 within the distributed ledger 120 or, in other embodiments of the invention, the predetermined period of time or data may commence in the future (i.e., on a specified date or the like). In specific embodiments of the invention, in which the second or third entity 426, 428 does not access an entirety of the corresponding first segment 432 or second segment 434 during the predetermined period of time for access, the tokenizer engine 450 may be configured to generate third data blocks (not shown in FIG. 3). The third data blocks are configured to store or otherwise provide access to at least the portion of the entirety of the corresponding first segment 432 or second segment 434 not accessed during the first predetermined time period. The third data block may be accessible to the second/third entity 426 428 during a second predetermined time period or may be accessible to the second/third entity 426, 428 at any point in time. Further, in such embodiments of the invention, the second predetermined period of time may commence upon expiration of the first predetermined period of time or, alternatively, in other embodiments of the invention, the second predetermined period of time after a time delay from the expiration of the first predetermined period of time (i.e., in the future).

For example, in specific embodiments of the invention, the first and/or second data asset transfer requests 420, 430 are configured to cause the instructions 410 to generate, and store in the distributed ledger, a series of first data blocks 130 or a series of second data blocks 140, such that each data block 130, 140 within the series is accessible to the second entity/third entity 426 428 for a predetermined period of time or at a predetermined date (e.g., once a month or the like). For example, in specific embodiments of the invention, the first entity 424 may desire that the data assets 422 associated with a data asset transfer request be "tiered" over several payment periods. In this instance, either the portion of the data block 130, 140 not accessed by the second entity 426 or third entity 428 may be used a "carry-over" value for generating a new block (i.e., the previously described third data block) or the system may be configured to recognize that the amount of data assets associated with a data asset transfer request is greater than a scheduled payment amount and, automatically, generate a series of data blocks 130 or 140, which are configured to be accessed sequentially over predetermined periods of time (e.g., one data block is accessible to the second/third entity 426, 428 each month or the like).

In other embodiments of the invention, the system may allow for the first entity or the system may be configured to determine that the first entity would benefit from a delay in the accessibility of one or more of the data blocks. In such instances, the data block 130, 140 may be configured to be accessible after a predetermined or determined "grace period" (e.g., 30, 60 days after storing the data block 130, 140 within the distributed ledger 120). In such instances the obligations owed under the first obligation or second obligation may vary (e.g., interest rate may vary, period for satisfying the obligation may vary or the like).

Referring to FIG. 4, a schematic diagram is shown of a system 500 that highlights data asset transfer requests over time and the associated data blocks within a distributed ledger of a distributed trust computing network, in accordance with embodiments of the present invention. In response to the receipt of first data transfer request 420-1, a first data block 130-1 (i.e., "Block 1") is generated and added to the distributed ledger 120. The first data block 130-1 provides a second entity (e.g., the seller or loaner) access to all of the data assets associated with the first data transfer request 420-1. Subsequently, over time, first data transfer requests 420-2 and 420-3 are received and, in response, first data blocks 130-2 and 130-3 (i.e., "Block 2" and "Block 3" are generated and added to the distributed ledger 120. First data blocks 130-2 and 130-3 provide an entity (e.g., the seller or loaner) access to all of the data assets associated with the first data asset transfer requests 420-2 and 420-3.

At a point in time indicated by the broken line, a second obligation is established between the first entity (e.g., buyer) and a third entity (e.g., second seller or loaner). In response to receiving second data asset transfer request 430-1, a second data block 140-1 (i.e., "Block 4") is generated and added to the distributed ledger 120. The second data block 140-1 includes sub-block 140-1A that stores or otherwise provides access to a first segment of the data asset associated with second data asset transfer request 430-1 and sub-block 140-1B that stores or otherwise provides access to a second segment of the data asset associated with second data transfer request 430-1. The first segment is accessible to the second entity to whom the first obligation is allocated and the second segment is accessible to the second or a third entity to whom the second obligation is allocated. As previously discussed, in alternate embodiments of the invention, individual second blocks 140 are generated and stored in the distributed ledger for each segment of the data asset. Subsequently, over time, second data transfer requests 430-2 is received and, in response, second data block 140-2 (i.e., "Block 5") is generated and added to the distributed ledger 120. Second data block 140-2 provides an entity (e.g., the seller or loaner) access to a first segment of the data asset configured to satisfy a portion of the first obligation and provide the same or another entity access to a second segment of the data asset configured to satisfy a portion of the second obligation.

FIG. 4 further illustrates that further obligations between the first entity and the same or other entities may be established and the basis for which is the data blocks 130, 140 stored in the distributed ledger 120 (i.e., the equity built up in the data asset transfers related to the first and second obligations). At a point in time indicated by the broken line, a third obligation is established between the first entity (e.g., buyer) and the second, third or another entity (e.g., third seller or loaner). In response to receiving third data asset transfer request 440-1, a third data block 150-1 (i.e., "Block 6") is generated and added to the distributed ledger 120. The third data block 150-1 includes sub-block 150-1A that stores or otherwise provides access to a first segment of the data asset associated with third data asset transfer request 440-1, sub-block 150-1B that stores or otherwise provides access to a second segment of the data asset associated with third data transfer request 440-1 and sub-block 150-1C that stores or otherwise provides access to a third segment of the data asset associated with third data transfer request 440-1. The first segment is accessible to the second entity to whom the first obligation is allocated, the second segment is accessible to the second or a third entity to whom the second obligation is allocated and the third segment is accessible to the second, third or another entity to whom the third obligation is allocated. Subsequently, at a point in time, indicated by the broken line, an Xth obligation is established between the first entity and the second, third, or another entity (e.g., third seller or loaner). In response to receiving a further data asset transfer request 480-1, a Nth data block 160-1 (i.e., "Block N") is generated and added to the distributed ledger 120. The Nth data block 150-1 includes sub-block 160-1A that stores or otherwise provides access to a first segment of the data asset associated with further data asset transfer request 480-1, sub-block 160-1B that stores or otherwise provides access to a second segment of the data asset associated with further data transfer request 480-1, sub-block 160-1C that stores or otherwise provides access to a third segment of the data asset associated with third data transfer request 480-1 and sub-block 160-1X that stores or otherwise provides access to an Xth segment of the data asset associated with third data transfer request 480-1. The first segment is accessible to the second entity to whom the first obligation is allocated, the second segment is accessible to the second or a third entity to whom the second obligation is allocated, the third segment is accessible to the second, third or another entity to whom the third obligation is allocated and the Xth segment is accessible to the second, third or another entity to whom the Xth obligation is allocated.

Referring to FIG. 5 an arc diagram is shown of a system 600 that highlights the concept of multiple obligations between the first entity 424 and other entities 426, 428, 429 and the segmenting of a data asset 422 within a single distributed ledger/thread 120 of a distributed trust/blockchain computing network, in accordance with embodiments of the present invention. Initially, the tokenizer engine 450 processes the data string associated with the first data asset transfer request and generates and stores in the distributed ledger 120 first data blocks that are accessible to the second entity 426 (i.e., the entity to whom the first obligation is allocated by the first entity to the second entity. In response to the first entity 424 establishing a second obligation allocated by the first entity to a third entity 428, the tokenizer engine 450 processes the data string associated with the second data asset transfer request and generates and stores in the distributed ledger 120 second data blocks, which provide the second entity with accesses to a first segment of the data asset 422 to satisfy a portion of the first obligation and provides the third entity with access to a second segment of the data asset 422 to satisfy a portion of the second obligation. Further, in response to the first entity establishing an Xth obligation allocated by the first entity to an Nth entity, the tokenizer engine 450 processes the data string associated with a further data asset transfer request and generates and stores in the distributed ledger 120 Xth data blocks, which provide the second entity with accesses to a first segment of the data asset 422 to satisfy a portion of the first obligation, provides the third entity with access to a second segment of the data asset 422 to satisfy a portion of the second obligation and provides the Nth entity with access to an Xth segment of the data asset 422 to satisfy a portion of the Xth obligation.

Referring to FIG. 6 an arc diagram is presented of a system 700 highlighting the concept of segmenting a data asset within a data block of a distributed ledger according to different transfer/distribution percentages, in accordance with embodiments of the present invention. Initially, a first entity 424 establishes a first obligation with a second entity 426 and provides a first data asset transfer request 420-1 (e.g., payment request) to a managing entity (e.g., financial institution or like). A first data block is generated and stored on a distributed ledger of a distributed trusted/blockchain computing network that is configured to provide the second entity 426 with 100% of the data assets associated with the first data asset transfer request. Subsequently, the first entity 426 establishes a second obligation with a third entity 428 and provides second data asset transfer requests 430 to the managing entity. Second data block(s) are generated and stored on the same distributed ledger of the distributed trust/blockchain computing network. As configured by the first entity or determined by the managing entity, the first one of the second data asset transfer requests 430-1 is configured to allocate 60% of the data assets to the second entity 426 to satisfy a portion of the first obligation and 40% of the data assets to the third entity 428 to satisfy a portion of the second obligation.

The second one of the second data asset transfer requests 430-2 is configured to allocate 66% of the data assets to the second entity 426 and 33% percent of the data assets to the third entity 428. It should be noted that the amount of the data assets associated with the second data asset transfer requests 430-1 and 430-2 may be the same amount or may be different amounts (e.g., the second one of the second data asset transfer requests 430-2 may be larger in volume than the first one of the second data asset transfer requests 430-1).

Subsequently, the X one of the data asset transfer requests 430-X is configured to allocate 50% of the data assets to the second entity 426 and 50% percent of the data assets to the third entity 428, the Y one of the data asset transfer requests 430-Y is configured to allocate 66% of the data assets to the second entity 426 and 33% percent of the data assets to the third entity 428, and the Z one of the data asset transfer requests 430-Z, in which the first obligation has previously been satisfied in full, is configured to allocate 100% of the data assets to the third entity 428. It should be noted that the volume of data assets of the data assets associated with backend ones (e.g., X and Y) the second data asset transfer requests 430-X and 430-Y may be have escalating amounts in order to satisfy the stipulations of the first obligation and/or the second obligation.

Referring to FIG. 7 a flow diagram is presented of a method 800 for distributed tiered data exchanges within a distributed trust/blockchain computing network, in accordance with embodiments of the present invention. At Event 810, first data asset transfer requests are received. Each first data asset transfer request is configured to transfer a data asset from a first entity to a second entity and each transfer of a data asset is a portion of a first obligation allocated by the first entity to the second entity. In specific embodiments of the invention, the data asset transfer requests are payment requests configured to transfer payment from a first entity/buyer to a second entity/seller. The payment may be a loan payment or the like owed by the buyer to a seller or loaning entity.

At Event 820, in response to receiving a first data asset transfer request, a data block is generated and stored in a distributed ledger of a distributed trust/blockchain computing network. Each data block that is generated stores or provides access to the data asset from one of the first data asset transfer requests and is configured to provide the second entity access to at least a portion of the data asset.

At Event 830, in response to (i) the first entity establishing a second obligation allocated by the first entity to either the second entity or a third entity, and (ii) receiving a second data asset transfer request, a second data block is generated and stored in the same distributed ledger as the first blocks. The second data block stores or provides access to the data asset associated with the second data asset transfer request and is configured to provide (i) the second entity access to a first segment of the data asset for satisfying at least a portion of the first obligation and (ii) the second entity or the third entity access to a second segment of the data asset for satisfying at least a portion of the second obligation. The trusted nature of the data blocks of the distributed ledger allow for the second obligation to be established solely based on the equity built-up in the first obligation. As such, the first entity/buyer is able to pivot to one or more additional obligations using the equity built up in the first obligation as collateral for the subsequent obligations without the need to make sizeable down payment or, in some instances, any down payment. Additionally, the distributed nature ledger provides for each entity to gain access to their allocated portion of a payment without having to rely on the initial seller to transfer a portion of the payment to subsequent sellers.

Thus, present embodiments of the invention provides for distributed tiered data asset exchanges within a distributed trust/blockchain network. A continual and ongoing data asset transfer being conducted via a distributed ledger of the distributed trust/blockchain network is leveraged for the purpose of establishing and conducting other continuous and ongoing data asset transfers using the same distributed ledger of the distributed trust/blockchain network. The tiered nature of the asset transfers/distributions means that one distributed ledger can be established and used to conduct multiple different continuous and ongoing data assets transfers between the initial data asset transfer entities and/or other entities. As such, through the use of one distributed ledger of a distributed trust/blockchain network, a single data asset request made by a first entity (i.e., data asset transferee) may be used to make multiple different data asset distributions/transfers to one or many different entities.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for distributed tiered data exchanges in a distributed trust computing network, the system comprising:
at least one distributed trust computing network comprising a plurality of decentralized nodes, each decentralized node having a first memory and at least one first processor in communication with the memory, wherein the first memory of the decentralized nodes is configured to store at least one distributed ledger; and
a computing platform disposed in a distributed computing network and including a second memory and at least one second processor in communication with the second memory, wherein the second memory stores instructions that are executable by the second processor and configured to:
receive a plurality of first data asset transfer requests, each first data asset transfer request configured to transfer a data asset from a first entity to a second entity, wherein each transfer of the data asset is a portion of a first obligation allocated by the first entity to the second entity,
generate, and store within a distributed ledger of the distributed trust computing network, a plurality of first data blocks, each first data block (i) storing or providing access to the data asset from one of the plurality of first data asset transfer requests, and (ii) configured to provide the second entity access to at least a portion of the data asset, and
in response to (i) the first entity establishing a second obligation allocated by the first entity to either the second entity or a third entity, and (ii) receiving a plurality of second data asset transfer requests:
generate, and store within the distributed ledger, second data blocks, each second data block (i) storing the data asset from one of the plurality of second data asset transfer requests, and (ii) configured to provide:
the second entity access to a first segment of the data asset for satisfying at least a portion of the first obligation, and
the second entity or third entity access to a second segment of the data asset for satisfying at least a portion of the second obligation.

2. The system of claim 1, wherein the first entity establishes the second obligation based on one selected from the group consisting of (i) at least in part on the plurality of first data blocks stored within the distributed ledger, and (ii) solely on the plurality of first data blocks stored within the distributed ledger.

3. The system of claim 1, wherein the instructions are further configured to in response to (i) the first entity establishing a further obligation allocated by the first entity to either the second entity, the third entity or another entity, and (ii) receiving a plurality of further data asset transfer requests:
generate, and store within the distributed ledger, further data blocks, each further data block (i) storing the data asset from one of the plurality of further data asset transfer requests, and (ii) configured to provide:
the second entity access to a first segment of the data asset for satisfying the first obligation,
the second entity or third entity access to the second segment of the data asset for satisfying the second obligation, and
the second entity, third entity or the further entity access a third segment of the data asset for satisfying the further obligation.

4. The system of claim 1, wherein the instructions are further configured to generate and store within the distributed ledger the second data blocks by generating, and storing within the distributed ledger, first-sub data blocks and second-sub data blocks, each first-sub data block (i) storing a first segment of the data asset from one of the plurality of second data asset transfer requests, and (ii) configured to provide the second entity access to the first segment of the data asset for satisfying the first obligation, and each second-sub data block (iii) storing a second segment of the data asset from one of the plurality of second data asset transfer requests, and (iv) configured to provide the second entity or the third entity access to the second segment of the data asset for satisfying the second obligation.

5. The system of claim 1, wherein the instructions are further configured to, in response to the first entity establishing a second obligation allocated by the first entity to either the second entity or a third entity, determine, for each second data block, a first percentage of the data asset as the first segment of the data asset for satisfying the first obligation and a second percentage of the data asset as the second segment of the data asset for satisfying the second obligation.

6. The system of claim 1, wherein the instructions are further configured to, in response to the first entity establishing a second obligation allocated by the first entity to either the second entity or a third entity, determine a data asset allocation schedule configured to establish, for each subsequent second data asset transfer request, a first percentage of the data asset as the first segment of the data asset for satisfying the first obligation and a second percentage or volume of the data asset as the second segment of the data asset for satisfying the second obligation.

7. The system of claim 1, wherein the instructions are further configured to, in response to the first entity establishing a second obligation allocated by the first entity to either the second entity or a third entity, determine an additional period of time for satisfying the first obligation allocated by the first entity to the second entity.

8. The system of claim 1, wherein the instructions are further configured to provide:
   the second entity access to the first segment of the data asset for satisfying at least a portion of the first obligation, and
   the second entity or third entity access to the second segment of the data asset for satisfying at least a portion of the second obligation,
   wherein the access is provided for a first predetermined period of time.

9. The system of claim 8, wherein the first predetermined period of time is selected from a group consisting of (i) a current period of time, and (ii) a future period of time.

10. The system of claim 8, wherein the instructions are further configured to, in response to at least one selected from the group consisting of (i) the second entity not accessing an entirety of the first segment during the first predetermined period of time, and (ii) the second or third entity not accessing an entirety of the second segment during the first predetermined period of time, generate, and store within the distributed ledger, one or more third data blocks, each third data block storing at least a portion of the first segment or second segment of the data asset not accessed during the first predetermined time period,
    wherein the second entity or the third entity is provided access to a third data block for a second predetermined period of time.

11. The system of claim 10, wherein the second predetermined period of time is selected from the group consisting of (i) a period of time commencing at an expiration of the first predetermined period of time, and (ii) a period of time commencing after a time delay from the expiration of the first predetermined period of time.

12. The system of claim 8, wherein the instructions are further configured to receive the first data asset transfer requests and the second data asset transfer requests, wherein at least one of the first data asset transfer requests or the second data asset transfer requests is configured to cause the instructions to generate, and store in the first memory of the distributed ledger, a series of the first data blocks or a series of the second data blocks, wherein each data block in the series of first data blocks provides the second entity with access to the data asset for a predetermined period of time and wherein each data block in the series of second data blocks provides (i) the second entity access to the first segment of the data asset for a predetermined period of time and (ii) the second entity or the third entity access to the second segment of the data asset for a predetermined period of time.

13. A computer-implemented method for distributed tiered data exchanges in a distributed trust computing network, the method executed by one or more computing device processors and comprising:
    receiving a plurality of first data asset transfer requests, each first data asset transfer request configured to transfer a data asset from a first entity to a second entity, wherein each transfer of the data asset is a portion of a first obligation allocated by the first entity to the second entity;
    generating, and storing within a distributed ledger of the distributed trust computing network, a plurality of first data blocks, each first data block (i) storing or providing access to the data asset from one of the plurality of first data asset transfer requests, and (ii) configured to provide the second entity access to at least a portion of the data asset; and
    in response to (1) the first entity establishing a second obligation allocated by the first entity to either the second entity or a third entity, and (2) receiving a plurality of second data asset transfer requests, generating, and storing within the distributed ledger, second data blocks, each second data block (i) storing the data asset from one of the plurality of second data asset transfer requests, and (ii) configured to provide (a) the second entity access to a first segment of the data asset for satisfying at least a portion of the first obligation, and (b) the second entity or third entity access to a second segment of the data asset for satisfying at least a portion of the second obligation.

14. The computer-implemented method of claim 13, wherein the first entity establishes the second obligation based on one selected from the group consisting of (i) at least in part on the plurality of first data blocks stored within the distributed ledger, and (ii) solely on the plurality of first data blocks stored within the distributed ledger.

15. The computer-implemented method of claim 13, further comprising, in response to (1) the first entity establishing a further obligation allocated by the first entity to either the second entity, the third entity or another entity, and (2) receiving a plurality of further data asset transfer requests, generating, and storing within the distributed ledger, further data blocks, each further data block (i) storing the data asset from one of the plurality of further data asset transfer requests, and (ii) configured to provide (a) the second entity access to a first segment of the data asset for satisfying the first obligation, (b) the second entity or third entity access to the second segment of the data asset for satisfying the second obligation, and (c) the second entity, third entity or the further entity access a third segment of the data asset for satisfying the further obligation.

16. The computer-implemented method of claim 13, further comprising, in response to the first entity establishing a second obligation allocated by the first entity to either the second entity or a third entity, determining, for each second data block, a first percentage of the data asset as the first segment of the data asset for satisfying the first obligation and a second percentage of the data asset as the second segment of the data asset for satisfying the second obligation.

17. A computer program product comprising:
    a non-transitory computer-readable medium comprising:
      a first set of codes for causing a computer to receive a plurality of first data asset transfer requests, each first data asset transfer request configured to transfer a data asset from a first entity to a second entity, wherein each transfer of the data asset is a portion of a first obligation allocated by the first entity to the second entity;
      a second set of codes for causing a computer to generate, and store within a distributed ledger of the distributed trust computing network, a plurality of first data blocks, each first data block (i) storing or providing access to the data asset from one of the plurality of first data asset transfer requests, and (ii) configured to provide the second entity access to at least a portion of the data asset; and a third set of codes for causing a computer to, in response to (1) the first entity establishing a second obligation allocated by the first entity to either the second entity or a third entity, and (2) receiving a plurality of second data asset transfer requests, generate, and store within the distributed ledger, second data blocks, each second data block (i) storing the data asset from one of the plurality of second data asset transfer requests, and (ii) configured to provide (a) the second entity access to a first segment of the data asset for satisfying at least a portion of the first obligation, and (b) the second entity or third entity access to a second segment of the data asset for satisfying at least a portion of the second obligation.

18. The computer-program product of claim 17, wherein the first entity establishes the second obligation based on one selected from the group consisting of (i) at least in part on the plurality of first data blocks stored within the distributed ledger, and (ii) solely on the plurality of first data blocks stored within the distributed ledger.

19. The computer-program product of claim 17, further comprising a fourth set of codes for causing a computer to, in response to (1) the first entity establishing a further obligation allocated by the first entity to either the second entity, the third entity or another entity, and (2) receiving a plurality of further data asset transfer requests, generating, and storing within the distributed ledger, further data blocks, each further data block (i) storing the data asset from one of the plurality of further data asset transfer requests, and (ii) configured to provide (a) the second entity access to a first segment of the data asset for satisfying the first obligation, (b) the second entity or third entity access to the second segment of the data asset for satisfying the second obligation, and (c) the second entity, third entity or the further entity access a third segment of the data asset for satisfying the further obligation.

20. The computer-program product of claim 17, further comprising a fourth set of codes for causing a computer to, in response to the first entity establishing a second obligation allocated by the first entity to either the second entity or a third entity, determining, for each second data block, a first percentage of the data asset as the first segment of the data asset for satisfying the first obligation and a second percentage of the data asset as the second segment of the data asset for satisfying the second obligation.

* * * * *